Aug. 30, 1932.  R. J. MILLER  1,875,096
LOCKING PIN DAMPING DEVICE
Filed Aug. 21, 1929
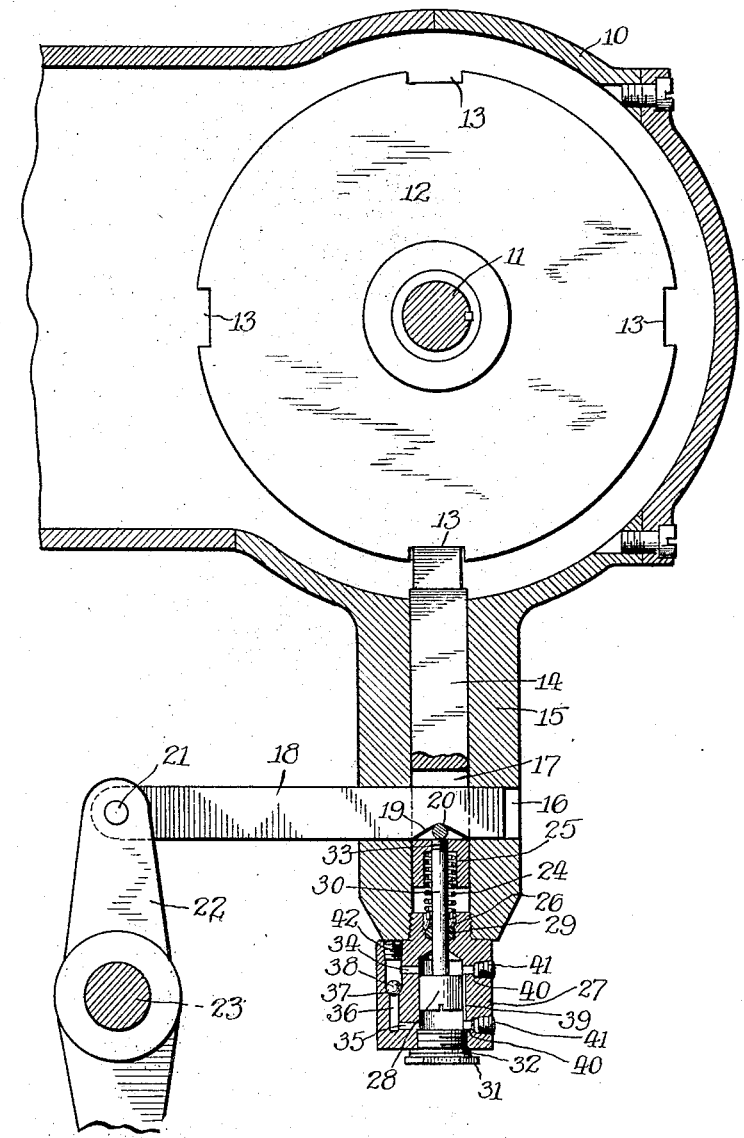
Inventor:
Ralph J. Miller,
By Fisher, Clapp, Soans & Pond, Attys.

Patented Aug. 30, 1932

1,875,096

UNITED STATES PATENT OFFICE

RALPH J. MILLER, OF MADISON, WISCONSIN, ASSIGNOR TO GISHOLT MACHINE COMPANY, OF MADISON, WISCONSIN, A CORPORATION OF WISCONSIN

LOCKING PIN DAMPING DEVICE

Application filed August 21, 1929. Serial No. 387,295.

In lathes employed for cutting threads on rods, bars, shafts, and the like, the threads are customarily cut by a cutting tool mounted on a tool post slide that is in turn mounted on a carriage slidable on and lengthwise of the lathe bed; the carriage, after the tool has made an initial cut on the work, being returned to starting position, the tool slide and tool slightly advanced to effect a deeper cut, and the carriage again advanced; these operations being repeated until a thread of the desired or predetermined depth has been cut on the work. In such a method of cutting, it is, of course, necessary for accurate work, that each time the point of the cutting tool is engaged with the work it shall exactly register with a previously cut groove of the thread. To do this, it is necessary to stop the return or back traverse of the carriage at an exact point with reference to the groove being cut. A mechanical attachment to effect this result is disclosed and claimed in Letters Patent to Edward F. McNutt, No. 1,749,598, March 4, 1930, owned by the assignee of the present application, and consisting essentially of a peripherally notched disc on or geared to the lead screw and a spring-actuated locking pin disposed radially of the disc and normally restrained from engaging the latter, but released simultaneously with the disengagement of the lead screw drive so that during the further rotation of the disc under the inertia of the carriage and lead screw the locking pin snaps into one of the notches of the disc and thus arrests the movement of the carriage at a point where the cutting tool will register with the groove being cut in the work.

Now, in practice it has been found that where the back traverse of the carriage is rapid and the disc rotates at high speed, the locking pin will not always remain in the first notch it encounters and arrest the rotation of the disc but will ride over several notches until the speed of rotation of the disc has sufficiently slackened, when it will snap into place and lock the disc against further rotation. This overrunning causes undue wear on the notches, and a severe pounding action which tends to injure the parts.

The main purpose of the present invention is to provide means for preventing this injurious action, whether the device be employed to arrest the rotation of a lead screw of a lathe or other machine tool or any other carriage driving member; and the invention is based on the principle of damping or retarding the working movement of the locking pin until the speed of rotation of the notched disc has slowed down to such an extent that the first notch thereof entered by the locking pin will not override the latter.

One simple form in which the invention may be embodied is illustrated in the accompanying drawing, in which the figure is an elevational view, partly in vertical section.

Referring to the drawing, 10 designates as an entirety a stationary casing or housing, through which extends a shaft 11, which, in the case of a lathe, may be either the lead screw, or a countershaft geared to the lead screw as disclosed in the McNutt patent above identified.

Fast on the shaft 11 is a disc 12 with one or more peripheral notches 13; four such notches being herein shown spaced ninety degrees apart.

These notches are designed to interlockingly cooperate with a radially-disposed locking pin 14 that is slidably mounted in a hollow guide 15 on the lower side of the casing 10. The guide 15 has a horizontal slot 16 near its lower end, and the pin 14 has a registering slot 17 of slightly greater width than the slot 16. Through the slots 16 and 17 extends a bar 18 formed on its lower side with an inverted V-shaped cam notch 19 that engages with a pin 20 mounted on the locking pin 14 crosswise of the lower portion of the slot 17 of the latter. One end of the bar 18 is pivoted at 21 to an upstanding arm 22 fast on a rock shaft 23, the shaft 23, in case of a lathe, having an operating connection to a clutch through which the drive of the lead screw 11 is thrown in and out. In the position of the parts illustrated in the drawing, the lead screw drive has been disengaged, but when the bar 18 is moved to the right so as to retract the locking pin 14 from the disc 12, the lead screw drive is thrown in as described in the McNutt patent above identified.

The locking pin is urged toward the periphery of the disc 12 by a thrust spring 24, the upper end of which is housed in a recess 25 in the lower end of the locking pin, and the lower end of which is footed on a gland 26 hereinafter referred to.

Describing now my improved device for damping or retarding the working stroke of the locking pin, 27 designates a hydraulic cylinder, in which is fitted a piston 28. The upper head of the cylinder is formed integral with its body portion and contains a stuffing box with a packing 29 and the gland 26, through which a piston rod 30 slides. The lower head of the cylinder consists of a plug screw 31, which is provided with a gasket 32 to insure a tight joint. The lower end of the locking pin 14 is provided with a tapped hole 33, in which the upper end of the piston rod 30 is screwed with a tight fit. The coil spring 24 encircles the piston rod 30, as shown.

The cylinder 27 contains two lateral ports 34 and 35 at opposite ends thereof, which ports are connected by a passage 36 in the wall of the cylinder. The upper portion of this passage is enlarged, and is formed with a seat 37 for a steel ball 38 constituting a check valve which will allow fluid to pass freely from the lower end of the cylinder to the upper end, but will prevent the passage of the fluid in the reverse direction. A very small groove 39 cut in the cylinder wall, as shown, forms a restricted by-pass for the fluid from one side of the piston 28 to the other.

The holes shown at 40 are for constructional purposes only, and are closed by taper plugs 41, as shown. A similar taper plug 42 closes the upper end of the passage 36.

The cylinder, ports, and all the open spaces connected with it, are filled completely with a fluid, preferably oil.

Assuming the application of the device to a lathe, at the starting of the rapid traverse movement of the carriage, the locking pin 14 is retracted from locking engagement with the notched disc by the bar 18, and the lead screw is free to rotate. This retraction of the locking pin pushes the piston 28 downwardly in the cylinder and transfers fluid from the space below the piston through the passage 36 and past the check valve 38 to the space above the piston. This downward movement of the piston is resisted only by the friction of the packing and the very slight force required to move the fluid past the check valve.

At the completion of the rapid traverse movement of the lathe carriage, by movement of the bar 18 to the left, the locking pin 14 is left free, and its inward movement into a notch under the pressure of spring 24 will raise the piston 28. Since the check valve 38 blocks the passage of fluid through passage 36 in a downward direction, the speed of the upward movement of the piston is retarded and governed by the rate at which the fluid can flow through the restricted by-pass 39.

The inertia of the lead screw and carriage, when left free at the end of the rapid traverse movement is sufficient to continue the rotation of the notched disc 12 for an appreciable length of time. The retarding action of the piston allows the speed of rotation of the disc to die down to a point where the locking pin will enter and lockingly engage one of the notches of the disc without jar, and also will previously pass over the intervening notch or notches without partial engagement, such as sometimes occurs where the upward movement of the pin is free. The area of the by-pass to give the proper speed to the inward movement of the locking pin is determined by experiment under the working conditions of the particular machine to which the device is applied.

I claim:

1. In a device for arresting the travel of a machine tool carriage, the combination of a rotatable disc fast with an element of the carriage drive and formed with a locking recess in its periphery, a slidable locking pin disposed radially of said disc with one end thereof engagable with the periphery of said disc, a spring urging said pin toward said disc, means for retracting said pin from said disc when the carriage drive is thrown in, a hydraulic cylinder having a piston and piston rod connected to said locking pin, and means in said cylinder permitting a free outward movement of said piston and locking pin and retarding the inward movement thereof.

2. In a device for arresting the travel of a machine tool carriage, the combination of a rotatable disc fast with an element of the carriage drive and formed with a locking recess in its periphery, a slidable locking pin disposed radially of said disc with one end thereof engageable with the periphery of said disc, a spring urging said pin toward said disc, means for retracting said pin from said disc when the carriage drive is thrown in, a hydraulic cylinder having a piston and piston rod connected to said locking pin, a flow passage connecting opposite ends of said cylinder, a check-valve in said passage permitting flow of fluid therethrough in one direction only, and a continuously open restricted flow passage in said cylinder connecting opposite ends of the latter.

RALPH J. MILLER.